United States Patent [19]

Buser et al.

[11] Patent Number: 4,460,869

[45] Date of Patent: Jul. 17, 1984

[54] DETERMINING THE STATE OF THE SURFACE OF A MOVING BODY USING EDDY CURRENTS TO OBTAIN FIRST AND SECOND RUNOUT PROFILES OF THE BODY

[75] Inventors: Werner Buser, Basel; Pierre Keller, Baden; Walter Münch, Zurich, all of Switzerland

[73] Assignee: BBC Brown, Boveri & Company, Limited, Baden, Switzerland

[21] Appl. No.: 351,494

[22] Filed: Feb. 23, 1982

Related U.S. Application Data

[63] Continuation of Ser. No. 962,106, Nov. 20, 1978, abandoned.

[30] Foreign Application Priority Data

Dec. 7, 1977 [CH] Switzerland ............... 14957/77

[51] Int. Cl.³ ............... G01R 33/12; G01N 27/72; G01K 7/36
[52] U.S. Cl. ............... 324/200; 324/226; 324/227; 324/233; 374/176
[58] Field of Search ............... 324/200, 207, 208, 224, 324/226–229, 233, 234, 236–240, 140 R, 140 D; 73/1 R, 1 J, 15 R, 15 A, 15 FD, 362 R; 364/551, 556, 557; 328/135; 374/163, 176

[56] References Cited

U.S. PATENT DOCUMENTS

| | | | |
|---|---|---|---|
| 3,681,970 | 8/1972 | Wells | 73/15 FD |
| 3,699,429 | 10/1972 | Ratz | 324/332 |
| 3,810,002 | 5/1974 | Sata | 324/236 |
| 3,833,850 | 9/1974 | Weber | 324/236 |
| 3,841,149 | 10/1974 | Edwin et al. | 364/551 |
| 3,882,305 | 5/1975 | Johnstone | 364/551 |
| 3,936,734 | 2/1976 | Brandli et al. | 324/243 |
| 3,939,404 | 2/1976 | Tait | 324/224 |
| 4,078,201 | 3/1978 | Buser | 324/233 |
| 4,086,527 | 4/1978 | Cadot | 324/233 |
| 4,112,353 | 9/1978 | Thompson | 324/54 |
| 4,125,943 | 11/1978 | Ando | 324/207 |
| 4,191,921 | 3/1980 | Yoshino | 328/135 X |

FOREIGN PATENT DOCUMENTS 575472 10/1977 U.S.S.R. ............... 324/236

*Primary Examiner*—Gerard R. Strecker
*Attorney, Agent, or Firm*—Oblon, Fisher, Spivak, McClelland & Maier

[57] ABSTRACT

A method and apparatus for monitoring the state of the surface of a moving body wherein a four-terminal eddy-current coil circuit is connected in a feedback loop of an RC resonator. The eddy-current coil circuit is placed in proximity to the monitored surface of the moving body and connected in the feedback loop of an RC resonator such that a change in the state of the surface of the moving body results in a change in the conductivity thereof, which conductivity change produces a phase displacement changing the output frequency of the RC resonator. During operation, a first data set is obtained from the coil circuit and RC resonator presenting a first runout profile of the body when the monitored state is in an initial state. The first data set is stored in a memory, and a subsequent profile is derived to obtain a second data set indicative of the operational state of the surface of the moving body. The second data set is also stored in the memory and then the first data set is subtracted from the second data set to obtain an effective or true profile of the surface of the body at the subsequent operational time.

7 Claims, 4 Drawing Figures

DETERMINING THE STATE OF THE SURFACE OF A MOVING BODY USING EDDY CURRENTS TO OBTAIN FIRST AND SECOND RUNOUT PROFILES OF THE BODY

This is a continuation of application Ser. No. 962,106, filed Nov. 20, 1978, now abandoned.

BACKGROUND OF THE INVENTION

1. Field of the Invention

This invention relates to an apparatus and a method for monitoring various selected characteristics at the surface of a moving body, for example the temperature profile, in which method the temperature, for example, is measured indirectly via a measurement of the surface conductivity by an eddy-current technique in which a coil arrangement is used, past which the surface of the body is conveyed at a constant distance.

2. Description of the Prior Art

In order to solve the problem of determining the temperature profile of the surface of moving bodies, particularly rotating axially symmetrical bodies, or bodies with plane surfaces which are moved linearly, various methods are presently in use.

One such method employs radiation pyrometry. However, this method often has been found to be disadvantageous since the emission factor of the body to be measured is generally unknown, may change in the course of time and is possibly not homogeneous over the entire periphery or surface. Moreover, in the case of polished metal bodies, the emission factor is very small and therefore complicates the problem. For an accurate temperature measurement, however, this factor must be known. Furthermore, in order to achieve a satisfactory resolution with high peripheral speeds or speeds of translation, detectors must be used which respond rapidly, which sometimes means that they must disadvantageously be cooled with liquid nitrogen. Also, a varying soiling of the body with oil, coolant etc. alters its optical characteristics to such an extent that a measurement using radiation pyrometry techniques becomes illusory.

Another method involves the installation of temperature sensors (such as thermocouple elements, resistance elements etc.) against the moving surface. The measured values of the sensors are then transmitted either via slip rings, by means of transmitters or inductively from the rotating or translating body. The transmission of measured values from a moving body or object always involves difficulties, however. Also, since only a restricted number of sensors can be installed, the local resolution is low, and in any event, the installation of such sensors is very expensive.

Yet another technique involves the fitting of thermocolors and thermostrips, which change color at a certain temperature. If this is possible, the production of a satisfactory, permanent thermal contact may still involve problems. Furthermore, the accuracy of the method is limited and the change of color at the response temperature is generally irreversible. In addition, the surface speeds should not be too high because otherwise the colors or strips become detached through centrifugal forces.

Other techniques involve inductive temperature measurements (see U.S. Pat. No. 3,936,734) if the rotational frequency of the body to be measured is much lower than the frequency of the alternating field of the exciting coil, which is generally the case. Here the great influence of the disturbing background ("runout") with magnetic materials must be accepted as a disadvantage (see, for example "Reduction of Electrical Runout to Improve the Accuracy of Eddy Current Probe Sensing of Turbomachinery Vibration", Journal of Lubrication Technology, October 1972, pages 297-301). This effect is extremely difficult to eliminate and is presumably attributable to inhomogenity in the electrical conductivity and the permeability. Its influence is so great that hitherto any temperature-profile measurement has been impossible which was based on the eddy current method.

SUMMARY OF THE INVENTION

Accordingly, it is an object of this invention to provide a novel method and apparatus for monitoring a selected characteristic, in particular the surface temperature profile of a moving body.

In accordance with this invention, there is provided an apparatus for monitoring the state of the surface of a moving body, comprising eddy-current coil arrangement mounted adjacent the moving body, means for storing a runout profile of the body obtained from the eddy-current coil arrangement when the body is in an initial state, means for storing a profile of the body obtained subsequently from the eddy-current coil arrangement, and means for subtracting the runout profile from the subsequent profile to obtain an effective or true profile of the body at the subsequent time.

This invention also provides a method of monitoring the state of the surface of a moving body using an apparatus as defined above, comprising, obtaining and storing data representing a runout profile of the body obtained from the eddy-current coil arrangement when the body is in an initial state, obtaining and storing data representing a profile of the body obtained subsequently from the eddy-current coil arrangement, and subtracting the runout profile data from the subsequent profile data to obtain an effective or true profile of the body at the subsequent time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
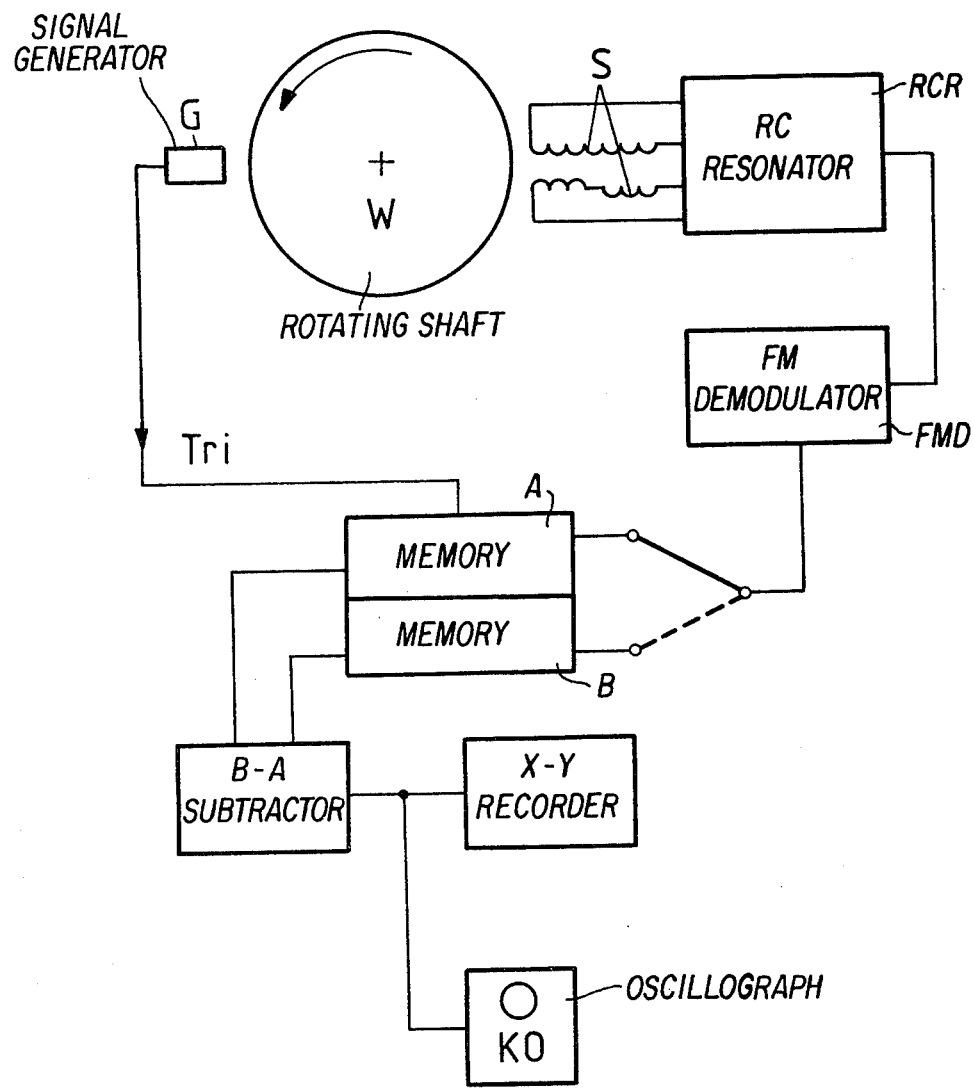
FIG. 1 is a block diagram of a temperature measuring apparatus.

Referring now to the drawings, and more particularly to FIG. 1 thereof, the above-described initial-state and subsequent-state storing can be effected simply, using digital stores A, B, which may be constructed, for example, in the form of transient recorders, signal mean-value formers etc. A measuring device for mesuring phase displacements at electrical four-terminal networks can be used with advantage in accordance with the invention, wherein the four-terminal network is the above-described eddy-current coil arrangement which serves to measure the surface temperature, and the frequency produced in the phasemeter depends on the phase and hence also on the temperature, so that demodulation of the frequency-modulated phase-meter output signal supplies a signal which is directly dependent on temperature. Ordinary commercial phasemeters, however, often have long measuring times which has a very adverse effect on the resolution over the periphery; moreover their accuracy is inadequate for determining temperature. Therefore an RC resonator in accordance with the U.S. Pat. No. 4,078,201 "Oscillator circuit for generating a signal whose frequency is representative of the phase shift of a four terminal network" is best suited as a phasemeter for the purpose of determining the temperature profile. The following advantages are thus achieved:

very accurate phase measurements are enabled, hence also an accurate temperature measurement;

very rapid phase measurement is enabled because the time constant of the system is very short, which leads to a high local resolution; and the frequency of the resonator serves as a measure of the phase.

In a profile measurement, therefore, a frequency-modulated signal is obtained which is less liable to interference than an amplitude-modulated signal.

Again, referring to FIG. 1, the designation W refers to a shaft, the surface temperature profile of which is to be determined. The designation RCR refers to an RC resonator with a coil arrangement S, which is mounted at a predetermined distance from the surface of the shaft W. Connected to the RCR is a FM demodulator FMD, which in conjunction with the RC resonator RCR, and the coil arrangement S serves as a phasemeter. The digital store A, B is provided, for example, in the form of a signal-mean-value former or a transient recorder having two channels A and B which can be selectively used to store data. Channel A stores the isothermal basic state data, while the instantaneous operational state data is stored in channel B. A subtraction unit, (B−A) is connected to the A and B channels for forming the difference of the data stored therein. The subtraction B−A can generally also otherwise be carried out in the storage units A, B and the result can be represented on a cathode-ray oscillograph KO or on a recorder X-Y. The digital data values in A and B can also be converted into analog values by means of digital-/analog converters, (not shown) with which values the subtraction is then carried out. For the subtraction in the correct phase, a trigger signal Tr is derived off from the rotating shaft W. This signal Tr is produced by a signal generator G which is controlled by a mark (magnetic or photoelectric, for example) provided on the surface of the shaft.

In the RC resonator in accordance with the U.S. Pat. No. 4,078,201, the four-terminal network is connected into the feedback loop of the RC resonator so that the frequency produced depends upon the phase displacement of the four-terminal network and of the RC phase shifter, the following conditions being fulfilled:

$$\rho(\omega) + \phi = 0 \text{ (or an integral multiple of } 2\pi) \quad (1)$$

$$|F(\omega)| \cdot \omega |H| A = 1 \quad (2)$$

in which
 $\phi$ = phase displacement of the four-terminal network
 $\rho(\omega)$ = phase displacement of the RC phase shifter
 $F(\omega)$ = damping of RC phase shifter
 H = attenuation of the four-terminal network
 A = real amplification factor and wherein furthermore H (p) and F (p) represent transfer functions of the unknown four-terminal network and of the RC phaseshifter respectively, and the real amplification factor A is adjusted by a control so that equation (2) is satisfied, the transfer function F (p) being embodied by a network in the form of an n-section decoupled RC low-pass filter in accordance with the expression $$F(p) = \frac{1}{(1 + pT)^n}$$

which low-pass filter dampens the voltage peaks occurring at the resonance frequencies of the coil arrangement to such an extent that the above oscillating conditions (1) and (2) cannot be fulfilled at these frequencies.

Figure 2A:
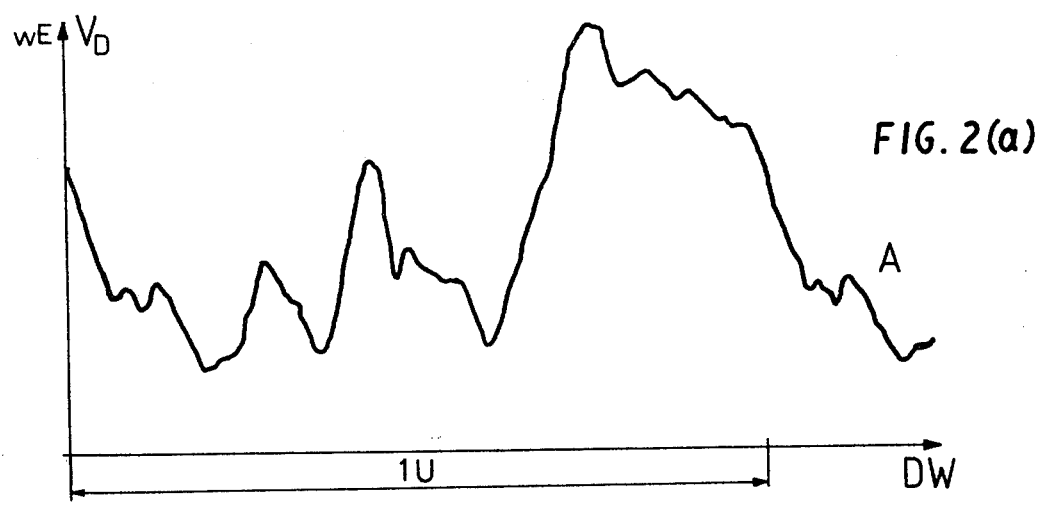
FIGS. 2a-2c are temperature profile curves measured experimentally.
Figure 2B:
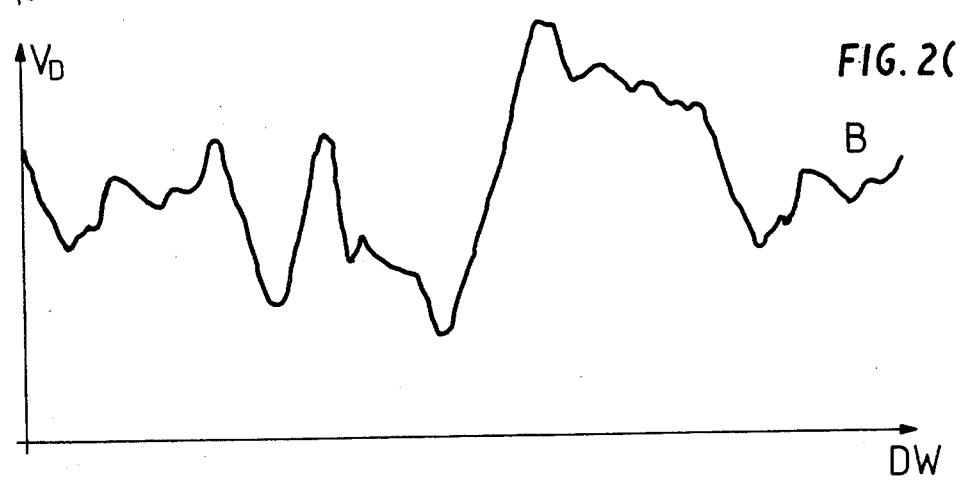
Figure 2C:
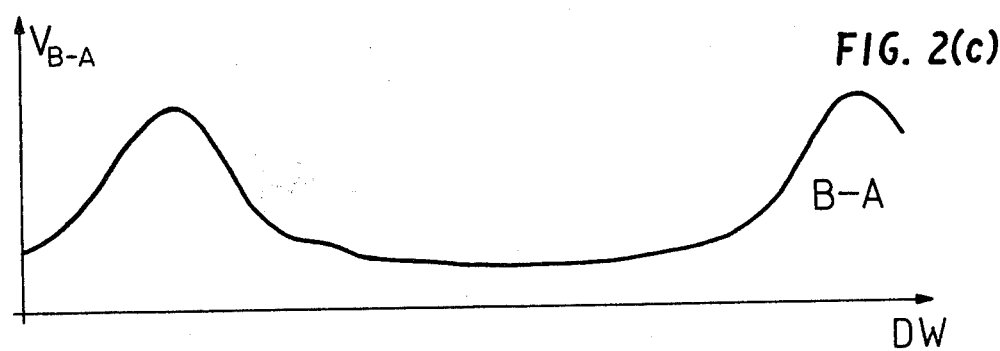

The profiles shown in FIGS. 2a–2c were obtained from a steel shaft having a diameter of 200 mm and rotating at 1000 r.p.m. The angle of rotation DW of the shaft starting from a specific reference point is entered in the abscissae of the curves (a), (b) and (c), and the output voltage $v_D$ of the frequency demodulator is entered in arbitrary units (wE) on the ordinates of (a) and (b). The length designated by "1 U" in (a) corresponds to one revolution of the shaft.

Firstly, the curve (a) of the isothermal state was plotted and stored in the store A. Then the shaft was heated locally by about 12° C. while at a standstill and as a result an inhomogeneous temperature distribution was produced. Thereupon, 60 seconds after starting up again, a second profile was plotted and stored in B, curve (b). The difference B−A gives the true temperature profile, curve (c), clearly illustrating the maximum of the local heating.

With this method it is possible, for the first time, to plot temperature profiles, without contact, on heavily soiled shafts, for example in segment bearings. Also rollers which are completely immersed in coolant can be measured (for example rolls in rolling mill stands).

Naturally, other eddy-current methods could be used, provided that the time constant is short in comparison with the time for one revolution.

Since the inductive methods are influenced by the electrical conductivity of the body or object and its permeability, the method can also be used for monitoring cracks on a rotating object.

Workpieces can also be scanned (for the purpose of temperature measurement or material testing) over any measuring distance by this method if they have a sufficiently smooth surface with little curvature, measured at the measuring head dimension, provided the scanning is effected with a constant object-to-sensor spacing and provided that a reference measurement of the kind indicated above can be carried out over the same measuring distance in the isothermal state of the object.

The method is also suitable for eliminating the runout in eddy-current distance measurements.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for monitoring the temperature at a surface of a moving metal body, comprising:

eddy-current coil circuit means, including a signal generator for inducing eddy currents in said metal body and a phasemeter mounted adjacent the metal body, for sensing said eddy currents in portions of said moving body and based thereof obtaining at selected times data signals indicative of surface conductivity of respective of said portions of said moving metal body as said respective portions of said moving metal body move past said phasemeter;

first memory means for storing a first series of said data signals obtained from said eddy-current coil circuit means during moving of said metal body when said metal body is in an initial isothermal state, said first series of data signals defining a first runout profile corresponding to an initial isothermal state at said surface of said metal body;

second memory means for storing a second series of said data signals obtained from said eddy-current coil current means at a selected time subsequent to storing of said first runout profile after an operational movement of said metal body, said second series of data signals defining a second runout profile indicative of the surface conductivity of said portions of said moving body at said selected time;

means coupled to said first and second memory means for synchronously reading out the first and second runout profiles stored therein and subtracting said first runout profile from said second runout profile such that data signals corresponding to the same portions of said metal body are subtracted from each other to obtain an effective or true runout profile indicative of a change in the surface conductivity of the metal body from the time when the first runout profile was obtained until said selected time when said second runout profile was obtained, said effective or true runout profile corresponding to the temperature change of said moving metal body as produced by operational movement thereof;

wherein the effects of local inhomogenieties in the composition of said metal body are substantially removed by subtracting said first runout profile from said second runout profile.

2. An apparatus as claimed in claim 1, in which the eddy-current coil circuit means comprises:

said phasemeter having a variable frequency output and including a measuring device arranged to measure phase displacements produced by said eddy currents, the frequency produced in the phasemeter depending upon the measured phase, a frequency demodulator being provided for demodulating the frequency-modulated phasemeter output signal.

3. An apparatus as claimed in claim 2, in which said eddy-current coil circuit means comprises:

an RC resonator circuit having a feedback loop and a frequency output;

eddy-current coils connected into said feedback loop so that the frequency output of said RC resonator depends upon the phase displacement between the eddy-current coils and the RC resonator, the following conditions being fulfilled:

$$(\omega)+(\phi)=0 \text{ (or an integral multiple of } 2\pi) \quad (1)$$

$$|F(\omega)| \cdot |H|A=1 \quad (2)$$

in which
$\phi$ = phase displacement of the four terminal network
$(\omega)$ = phase displacement of the RC phase shifter
H = attenuation of the four-terminal network
A = real amplification factor and wherein furthermore H(p) and F(P) represent transfer functions of the eddy-current coils and of the RC resonator respectively, and A is adjusted by a control so that equation (2) is satisfied, the transfer function F(p) being embodied by a network in the form of an n-section decoupled RC low-pass filter in accordance with the expression, $$F(p) = \frac{1}{(1 + pt)^n}$$

which low-pass filter dampens the voltage peaks occurring at the resonance frequencies of the four-terminal current coil circuit to such an extent that the above oscillating conditions (1) and (2) cannot be fulfilled at these frequencies.

4. An apparatus as claimed in claim 1, wherein said first and second memory means comprises:

means for converting the signals from the eddy-current coil circuit means into digital form before storage thereof.

5. An apparatus as claimed in claim 4, in which the subtraction is carried out in digital form.

6. An apparatus as claimed in claim 4, further comprising:

digital/analog converters provided after the first and second memory means such that the subtraction is carried out using the analog values produced by the converters.

7. A method of monitoring the temperature on a surface of a moving metal body using a signal generator for producing eddy currents in said metal body and a phasemeter formed by an eddy-current coil circuit connected in a feedback loop of an RC resonator for sensing said eddy current, wherein said phasemeter produces data signals indicative of said eddy currents and also indicative of changes in the surface conductivity of the moving metal body as portions of said metal body move past said eddy-current coil circuit, said data signals also corresponding to the temperature of the moving metal body, comprising:

obtaining and storing a first series of said data signals from said phasemeter during moving of said metal body when said metal body is in an initial isothermal state, said first series of data signals defining a first runout profile corresponding to an initial isothermal state at said surface of said metal body;

obtaining and storing a second series of said data signals from said phasemeter at a selected time subsequent to storing of said first runout profile after an operational movement of said metal body, said second series defining a second runout profile indicative of the surface conductivity of said portions of said moving body moving past said eddy current coil circuit after said operational movement; and reading out the stored first and second runout profiles in synchronism and subtracting said first runout profile from said second runout profile such that data signals corresponding to the same portions of said metal body are subtracted from each other to obtain an effective or true runout profile indicative of a change in the surface conductivity of the metal body from the time when the first runout profile was obtained until said selected time when said second runout profile was obtained, said effective or true runout profile corresponding to the temperature change of said moving metal body as produced by operational movement thereof;

wherein the effects of local inhomogenieties in the composition of said metal body are substantially removed by subtracting said first runout profile from said second runout profile.

* * * * *

UNITED STATES PATENT AND TRADEMARK OFFICE
CERTIFICATE OF CORRECTION

PATENT NO. : 4,460,869

DATED : July 17, 1984

INVENTOR(S) : Buser et al.

It is certified that error appears in the above-identified patent and that said Letters Patent is hereby corrected as shown below:

On the title page item [30] should read as follows:

```
--    Foreign Application Priority Data
      Dec. 7, 1977 [CH]  Switzerland ....... 14952/77 --
```

Signed and Sealed this

Fifth Day of February 1985

[SEAL]

Attest:

DONALD J. QUIGG

Attesting Officer　　Acting Commissioner of Patents and Trademarks